United States Patent [19]

Meisenburg

[11] Patent Number: 4,869,121

[45] Date of Patent: Sep. 26, 1989

[54] MARINE PROPULSION UNIT WITH IMPROVED DRIVE SHAFT ARRANGEMENT

[75] Inventor: Gary L. Meisenburg, Fond du Lac, Wis.

[73] Assignee: Brunswick Corporation, Skokie, Ill.

[21] Appl. No.: 197,770

[22] Filed: May 23, 1988

[51] Int. Cl.⁴ ............................................. F16H 19/00
[52] U.S. Cl. ..................................................... 74/323
[58] Field of Search ........................................... 74/323

[56] References Cited

U.S. PATENT DOCUMENTS

| | | | |
|---|---|---|---|
| 4,244,454 | 1/1981 | Bankstahl | 192/21 |
| 4,257,506 | 3/1981 | Bankstahl | 192/21 |
| 4,630,719 | 12/1986 | McCormick | 192/21 |

Primary Examiner—Dirk Wright
Attorney, Agent, or Firm—Andrus, Sceales, Starke & Sawall

[57] ABSTRACT

A marine propulsion unit (1) is provided wherein the main drive shaft (42) includes an integrally formed annular portion (46) of enlarged diameter at the location of a previously utilized lower groove and keepers (38, 37). The enlarged diameter portion increases the mass and strength of the shaft at a position subject to substantial torque forces, thus substantially eliminating problems of shaft fracture or breakage. In addition, the enlarged diameter portion is formed in the shape of a thrust collar so that the shaft can be accommodated by the previous known shaft mounting elements without redesign of the latter.

5 Claims, 2 Drawing Sheets

MARINE PROPULSION UNIT WITH IMPROVED DRIVE SHAFT ARRANGEMENT

BACKGROUND AND SUMMARY OF THE INVENTION

This invention relates to a marine propulsion unit and an improved drive shaft arrangement therefor. More particularly, the invention relates to the upper drive shaft portion and its mounting adjacent the clutch apparatus.

As disclosed in U.S. Pat. Nos. 4,244,454, 4,257,506 and 4,630,719, the generally vertical drive shaft providing the main drive connection between the engine and lower propeller unit has conventionally been mounted at its upper end adjacent the clutching mechanism for reverse and forward drive. The clutching mechanism has included spaced forward and reverse bevel gears which are selectively engaged by a shift sleeve mounted to the drive shaft.

Heretofore, the drive shaft has been provided with a lower annular groove adjacent the forward drive bevel gear, and an upper annular groove adjacent the reverse drive bevel gear. A separate annular lower thrust collar has been positioned adjacent the lower groove, while a separate annular upper thrust collar has been positioned adjacent the upper groove. The thrust collars have been assembled to the drive shaft by sliding them onto the shaft ends, one by one, and locking the collars into position by means of arcuate keepers which have been snapped into place in the grooves.

The conventional construction has been of costly design due to the very close tolerances required between the keepers and the grooves. Furthermore, assembly of the parts has not been easy. In addition, it has been observed that the drive shaft has tended to fracture or break in the area of the lower groove.

It is an object of the present invention to substantially reduce and/or eliminate the aforementioned problems.

It has been known that the thrust forces from the engine output shaft are always transmitted to the main drive shaft at a position below the upper collar, regardless of whether the drive is operating in forward or reverse. Thus, the problem of shaft breakage in the vicinity of the lower collar and at the lower groove is believed to have been caused primarily by the reduced amount of metal available at the lower groove combined with the subjecting of the lower groove area to the thrust forces whenever the shaft is driving.

In accordance with the various aspects of the invention, a marine propulsion unit is provided wherein the main drive shaft includes an integrally formed annular portion of enlarged diameter at the location of the previously utilized lower groove and keepers. The enlarged diameter portion increases the mass and strength of the shaft at a position subject to subtantial torque forces, thus substantially eliminating problems of shaft fracture or breakage. In addition, the enlarged diameter portion is formed in the shape of a thrust collar so that the shaft can be accommodated by the previous known shaft mounting elements without redesign of the latter.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
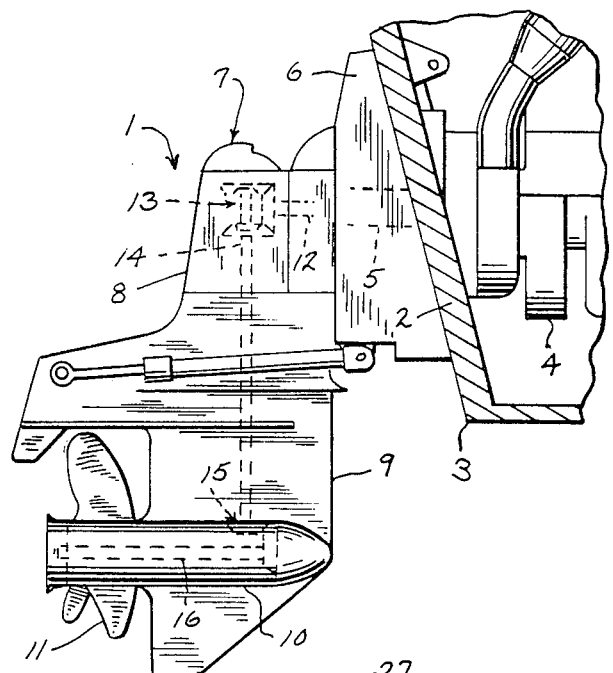
FIG. 1 is a generally schematic side elevation of a stern drive marine propulstion unit which may incorporate the various aspects of the invention, and with parts in section.

FIG. 1 of the drawings illustrates the present invention as applied to a marine stern drive unit, although the inventive aspects are equally applicable to an outboard motor or other similar devices. As shown, stern drive unit 1 is adapted to be suitably mounted to the transom 2 of a boat 3. An internal combustion engine 4 is disposed within the boat and includes an output with a shaft 5 which extends through transom 2 and a mounting plate 6 secured to unit 1, in the usual manner.

Stern drive unit 1 generally includes a stern drive housing 7 forming an upper gear case 8, a lower gear case 9 suitably mounted to gear case 8, and a generally horizontally fore-to-aft extending torpedo housing 10 forming a portion of and disposed at the bottom of gear case 9. In the present embodiment, a propeller 11 is mounted for rotation generally aft of housing 10. For purposes of driving propeller 11, engine output shaft 5 is suitably connected to an input shaft 12 in unit 1. Generally, input shaft 12 connects through a clutch assembly 13 to a downwardly extending main drive shaft 14, which in turn connects at its lower end through suitable gearing 15 and a propeller shaft 16 to drive propeller 11.

Figure 2:
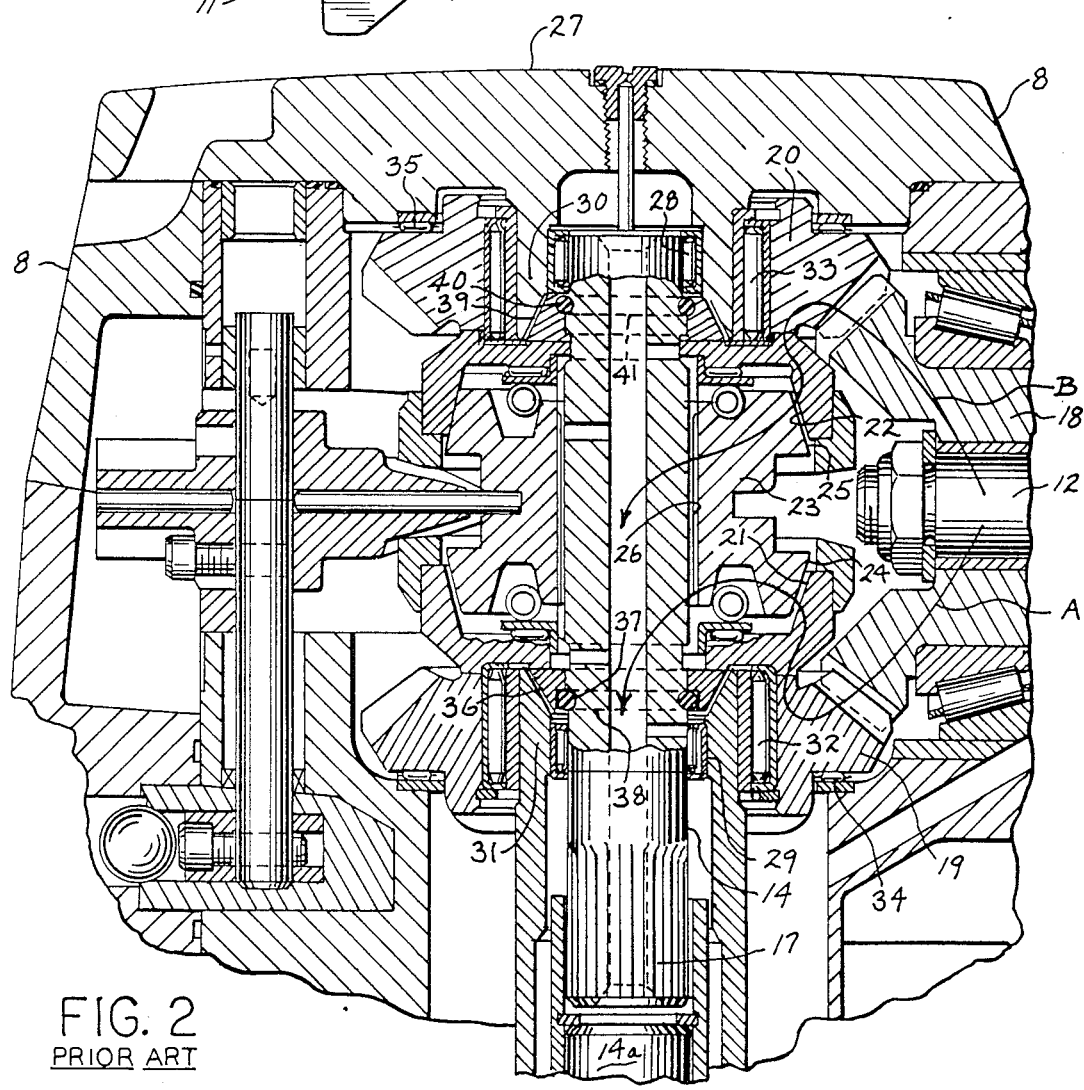
FIG. 2 is an enlarged side elevational view, mostly in section, of the upper portion of a stern drive of previously known construction.

FIG. 2 illustrates the previously known stern drive construction, as illustrated in the aforementioned U.S. Patents, the contents of which are incorporated herein by reference. As shown, main drive shaft 14 may be formed in segments, with the upper shaft element 14 relatively short and of generally constant diameter and connected at its lower end portion to the upper end of the lower shaft element 14a, as by a splined connection 17.

Input shaft 12 carries an input bevel gear 18 which drives a counter rotating forward bevel gear 19 and reverse bevel gear 20 which are mounted to rotate about axial main drive shaft 14. Gears 19 and 20 are axially spaced, with forward bevel gear 19 disposed below reverse bevel gear 20. The forward and reverse bevel gears 19 and 20 each have an internal conical clutch surface 21,22 respectively, attached by welding, facing each other. Drive shaft 14 carries a sleeve member 23 between clutch gears 19 and 20, the sleeve member having conical clutch faces 24,25 on each end for mating with the forward and reverse gears. Sleeve member 23 is suitably splined to shaft 14, as at 26. Shifting of sleeve member 23 axially causes engagement of one or the other of gears 19 or 20, to drive shaft 14 in the desired direction, in the usual manner.

A top cover 27 is attached to upper gear case 8 by any suitable means, not shown. The upper main drive shaft element 14 is supported for rotation by and journalled in upper and lower main needle bearings 28 and 29 which are mounted on the inside of annular projections 30 and 31 extending downwardly from top cover 27 and upwardly from within the housing, respectively. Mounted on the outside of projections 30 and 31, in substantially the same plane as main bearings 28 and 29 and the gear teeth, are forward and reverse gear needle bearings 32 and 33 which carry the forward and reverse clutch gears 19 and 20. Thrust bearings 34 and 35 are mounted on gear case 8 to position the forward and reverse gears 19 and 20 and support the axial loads thereon.

In the known construction of FIG. 2, upper main shaft element 14 is provided with a separate lower thrust collar 36 which is assembleable onto the lower shaft element end. Collar 36 is held in place inwardly of said end by a plurality of arcuate keepers 37 of suitably formed metal which are snappingly disposed in an annular groove 38 disposed in the wall of shaft element 14 and axially inwardly of and closely adjacent lower main needle bearing 29. Likewise, main shaft element 14 is provided with a separate upper thrust collar 39 which is assembleable onto the upper shaft element end. Collar 39 is likewise held in place inwardly of said upper end by a plurality of arcuate keepers 40 of suitably formed metal which are snappingly disposed in an annular groove 41 disposed in the wall of shaft element 14 and axially inwardly of and closely adjacent upper main needle bearing 28. Collars 38 and 39 are axially spaced along shaft element 14. In addition, grooves 38 and 41 form recesses in the body of shaft element 14 which reduce the diameter thereof.

The thrust forces from input shaft 12 in the known device (illustrated by the arrowed lines A & B) are transmitted to shaft 14 in the area between upper collar 39 and lower collar 36, and hence downwardly through the area of lower collar 36 and its adjacent bearings 29,32,34, during both forward and reverse rotation of shaft 14. The area of upper collar 39 and its adjacent bearings 28,33,35 is therefore relatively free of the thrust forces.

The remaining undescribed structure shown in FIG. 2 is conventional and more fully disclosed in the aforementioned U.S. Patents.

As previously pointed out, the known drive shaft-mounting construction of FIG. 2 is subject to the disadvantages of relatively high cost, lack of assembly ease, and especially an observed problem of fracturing and breaking of the shaft in the area of lower collar 36. The aspects of the invention are contemplated for solving these problems.

Figure 3:
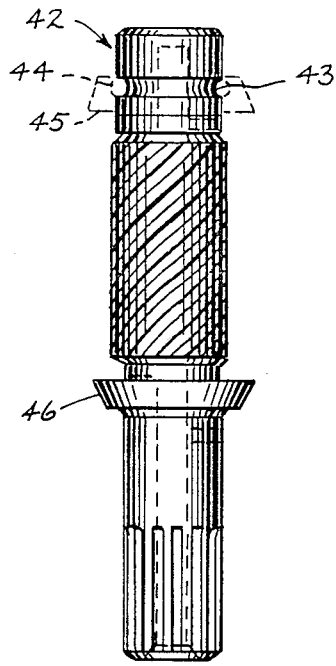
FIG. 3 is a side elevation of a drive shaft element constructed in accordance with the various aspects of the present invention.
Figure 4:
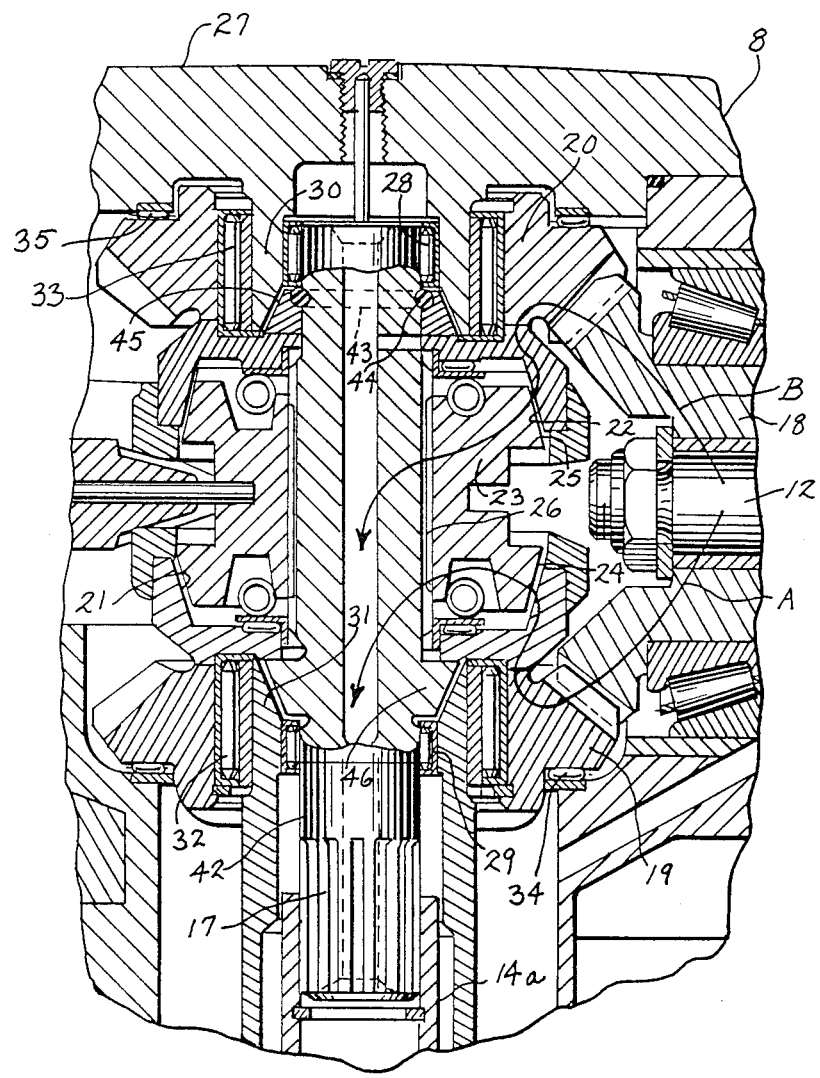
FIG. 4 is a view similar to FIG. 2 and showing the drive shaft element of FIG. 3 mounted in the upper portion of the stern drive.

In accordance with the various aspects of the invention, and turning now to FIGS. 3 and 4, upper main shaft element 14 of FIG. 2 is replaced by an improved main shaft element 42, which is also of generally constant diameter, but with several important differences. The design of shaft element 42 is such that it can be mounted in the same assembly as is shown in FIG. 2, so that most reference numerals applied to the other parts of the assembly in FIG. 2 are also used in FIG. 4.

Since the upper portion of shaft element 42 is not subject to the thrust forces illustrated at A and B, the upper portion of element 42 is provided with a diameter-reducing upper groove 43 for receipt of a plurality of arcuate metal keepers 44 which lock a separate upper thrust collar 45 in place after the latter has been assembled onto the upper portion of the shaft element. This is similar to the known construction.

However, in this instance, the previously used lower groove and associated keepers are eliminated and there is provided instead, and at the same axial location (adjacent lower bearings 29, 32, 34 and drive gear 19), an annular enlargement 46 which is cast with or otherwise integrally formed with the shaft element body. The enlargement 46 increases the diameter, and thus the mass and structural strength of shaft element 42, thus essentially eliminating the tendency of element 42 to fracture or break in that area. As shown, annular enlargement 46 is shaped, in section, similarly to upper collar 45.

By providing enlargement 46 at the lower end of shaft element 42, the total cost of providing collar keepers is reduced by half. Furthermore, since no assembly is needed for integral enlargement 46, the total assembly effort is also cut in half for the shaft element.

The various aspects of the invention provide a simple, effective and yet unique improvement over prior marine propulsion unit drive shaft arrangements.

Various modes of carrying out the invention are contemplated as being within the scope of the following claims which particularly point out and distinctly claim the subject matter regarded as the invention.

I claim:

1. In a marine propulsion unit (1) for a boat (3), the combination comprising:
   (a) a generally vertical drive housing (7) carrying a propeller (11) at its lower end,
   (b) an input shaft (12) associated with said housing for connection to an engine associated with said unit,
   (c) an axially downwardly extending main drive shaft element (42) of generally constant diameter disposed in said housing for driving said propeller from said input shaft,
   (d) axially spaced lower and upper drive gears (19, 20) mounted to rotate about said drive shaft element,
   (e) lower bearing means (29) journalling said drive shaft element adjacent said lower drive gear (19),
   (f) and annular enlargement means (46) formed in one piece with and on said drive shaft element and disposed adjacent said lower bearing means for increasing the mass and strength of said drive shaft element adjacent said bearing means.

2. The combination of claim 1:
   (a) which includes:
      (1) upper bearing means (28) journalling an upper end portion of said drive shaft element (42) adjacent said upper drive gear (20),
      (2) a shaft diameter reducing annular groove (43) disposed in said drive shaft element adjacent said upper bearing means,
      (3) an upper thrust collar (45) assembleable to said drive shaft element and disposed axially inwardly of said groove,
      (4) keeper means (44) disposed in said groove for holding said collar in place on said upper end portion of said drive shaft element,
   (b) and wherein said annular enlargement means (46) is shaped, in section, similarly to said upper thrust collar.

3. The combination of claim 1:
   (a) which includes upper thrust collar means (45) disposed on the upper portion of said drive shaft element,
   (b) and wherein said annular enlargement means (46) is shaped, in section, similarly to said upper thrust collar means.

4. The combination of claim 1:

(a) which includes upper thrust collar means (45) assembleable to and disposed on the upper portion of said drive shaft element, (b) and wherein said integral annular enlargement means (46) is shaped, in section, similarly to said upper thrust collar means.

5. For mounting within the upper portion of a generally vertical drive housing (7) of a marine propulsion unit (1) for a boat (3), and wherein said housing mounts vertically spaced upper and lower bearings (28, 29); drive means for connection to a marine engine associated with said unit, said drive means comprising, in combination:

(a) an elongated main drive shaft element (42) adapted to be disposed adjacent the bearings within the housing, said drive shaft element having a generally constant diameter, (b) and annular enlargement means (46) formed in one piece with and on said drive shaft element and with said enlargement means being adapted and disposed to increase the mass and strength of said drive shaft element adjacent a lower bearing.

* * * * *

UNITED STATES PATENT AND TRADEMARK OFFICE
CERTIFICATE OF CORRECTION

PATENT NO. : 4,869,121

DATED : September 26, 1989

INVENTOR(S) : Gary L. Meisenburg

It is certified that error appears in the above-identified patent and that said Letters Patent is hereby corrected as shown below:

Column 2, line 2, delete "propulstion" and substitute therefore --propulsion--.

Column 3, line 26, after "Collars" delete "38" and substitute therefore --36--.

Signed and Sealed this

Twenty-first Day of August, 1990

Attest:

HARRY F. MANBECK, JR.

*Attesting Officer*  *Commissioner of Patents and Trademarks*